United States Patent
Richter et al.

(10) Patent No.: US 8,213,938 B2
(45) Date of Patent: Jul. 3, 2012

(54) DETECTION OF FAILURES IN A TELECOMMUNICATION SYSTEM

(75) Inventors: Yossi Richter, Haifa (IL); Elad Yom-Tov, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 12/485,946

(22) Filed: Jun. 17, 2009

(65) Prior Publication Data

US 2010/0323687 A1     Dec. 23, 2010

(51) Int. Cl.
*H04W 36/00* (2009.01)

(52) U.S. Cl. ............... 455/436; 455/424; 455/115.1; 455/405; 455/403; 455/421; 455/456.1; 455/440

(58) Field of Classification Search ............... 455/436, 455/424, 115.1, 405, 403, 421, 456.1, 440
See application file for complete search history.

(56) References Cited

U.S. PATENT DOCUMENTS

| | | | |
|---|---|---|---|
| 6,038,444 A | 3/2000 | Schipper et al. | |
| 6,950,656 B1 | 9/2005 | Bahk et al. | |
| 7,310,526 B2 | 12/2007 | Sang et al. | |
| 8,023,964 B2 * | 9/2011 | Hadinata et al. | 455/456.1 |
| 2003/0190917 A1 * | 10/2003 | De Cambray-Mathan | 455/446 |
| 2004/0077331 A1 | 4/2004 | King | |
| 2007/0099561 A1 | 5/2007 | Voss | |
| 2009/0052330 A1 * | 2/2009 | Matsunaga et al. | 370/242 |

* cited by examiner

*Primary Examiner* — Nimesh Patel
(74) *Attorney, Agent, or Firm* — Glazberg Ziv

(57) ABSTRACT

Determining a network transmitter that is more likely to cause handoff failures in a telecommunication service based on historical data records. The historical data records may be standard Call Data Records. A probability that a service provided by a first network transmitter will be handoffed to a second network transmitter is determined. An indication that a target network transmitter is overly busy is determined based on the number of failed services for each network transmitter that may handoff a service the target network transmitter and the probability that a service will be handoffed to the target network transmitter. Based on the indication, measures may be taken to increase quality level of the target network transmitter.

20 Claims, 3 Drawing Sheets

DETECTION OF FAILURES IN A TELECOMMUNICATION SYSTEM

BACKGROUND

The present disclosure relates to telecommunication systems, and to quality assurance of telecommunication systems, in particular.

In cellular telecommunication systems, an initial base station comprising a transmitter provides communication services to cellular devices in its vicinity. An initial base station is a base station that provides the service in the beginning of the service. When a cellular device changes its position such that the initial base station can no longer provide a reasonable service quality, the initial base station initiates handoff to a target base station or receives a request for a handoff from the cellular device. However, the target base station may not be able to provide the services due to, for example, being overly busy handling other devices or providing other services. In such a scenario, the handoff fails, and the initial base station continues to provide the service until it can no longer do so. In some systems, the initial base station drops a service when signal quality deteriorates below a minimal quality threshold.

It will be noted that the above scenario is not limited to a cellular telecommunication system. Rather, it may occur in any telecommunication system in which an initial transmitter providing a service initiates a request from a target transmitter to continue providing said service, allowing the initial transmitter to cease providing the service. In the present specification, a handoff refers to an operation of transferring an ongoing telecommunication service from a first provider, such as a first transmitter, to a second provider, such as a second transmitter.

The aforementioned scenario may be resolved by upgrading the target base station, such that it may be able to cope with a heavier load. In order to do so, a problematic base station, such as the target base station, needs to be identified. In the present specification, a problematic base station or problematic network transmitter refers to a base station or network transmitter that regularly does not perform requested handoffs, such as the target base station. Yet, standard Call Data Records (CDRs) do not log failed handoff attempts. Rather, the above scenario may be recorded as a failure of the initial base station to provide the service.

BRIEF SUMMARY OF THE INVENTION

One exemplary embodiment of the disclosed subject matter is a computerized system comprising: an interface to a database; the database comprises an at least one data record; the at least one data record represents a first service provided by a telecommunication system; the at least one data record comprises: an indication of a transmitter used for providing the first service; and a quality measurement of the first service; a transmitter relation module for determining an indication of a first transmitter providing a second service to initiate a request from a second transmitter to provide the second service; a processor; and a transmitter quality module for determining a quality of service provided by an additional transmitter utilizing the processor; the quality of service is determined based on: the quality measurement of a portion of the at least one data record; and a portion of the indication determined by the transmitter relation.

Another exemplary embodiment of the disclosed subject matter is a method comprising: retrieving an at least one data record from a database; the at least one data record represents a first service provided by a telecommunication system; the at least one data record comprises: an indication of a transmitter used for providing the first service; and a quality measurement of the first service; determining an indication of a first transmitter providing a second service to initiate a request from a second transmitter to provide the second service; and determining a quality of service provided by an additional transmitter; the determining a quality of service provided by the additional transmitter is performed by a processor; the quality of service is determined based on: the quality measurement of a portion of the at least one data record; and a portion of the indication determined by the transmitter relation; whereby a quality measurement associated with the first transmitter is transformed to a quality measurement associated with the second transmitter.

Yet another exemplary embodiment of the disclosed subject matter is a computer program product comprising: a computer readable medium; first program instruction for retrieving an at least one data record from a database; the at least one data record represents a first service provided by a telecommunication system; the at least one data record comprises: an indication of a transmitter used for providing the first service; and a quality measurement of the first service; second program instruction for determining an indication of a first transmitter providing a second service to initiate a request from a second transmitter to provide the second service; and third program instruction for determining a quality of service provided by an additional transmitter; the quality of service is determined based on: the quality measurement of a portion of the at least one data record; and a portion of the indication determined by the transmitter relation; wherein the first, second and third program instructions are stored on the computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
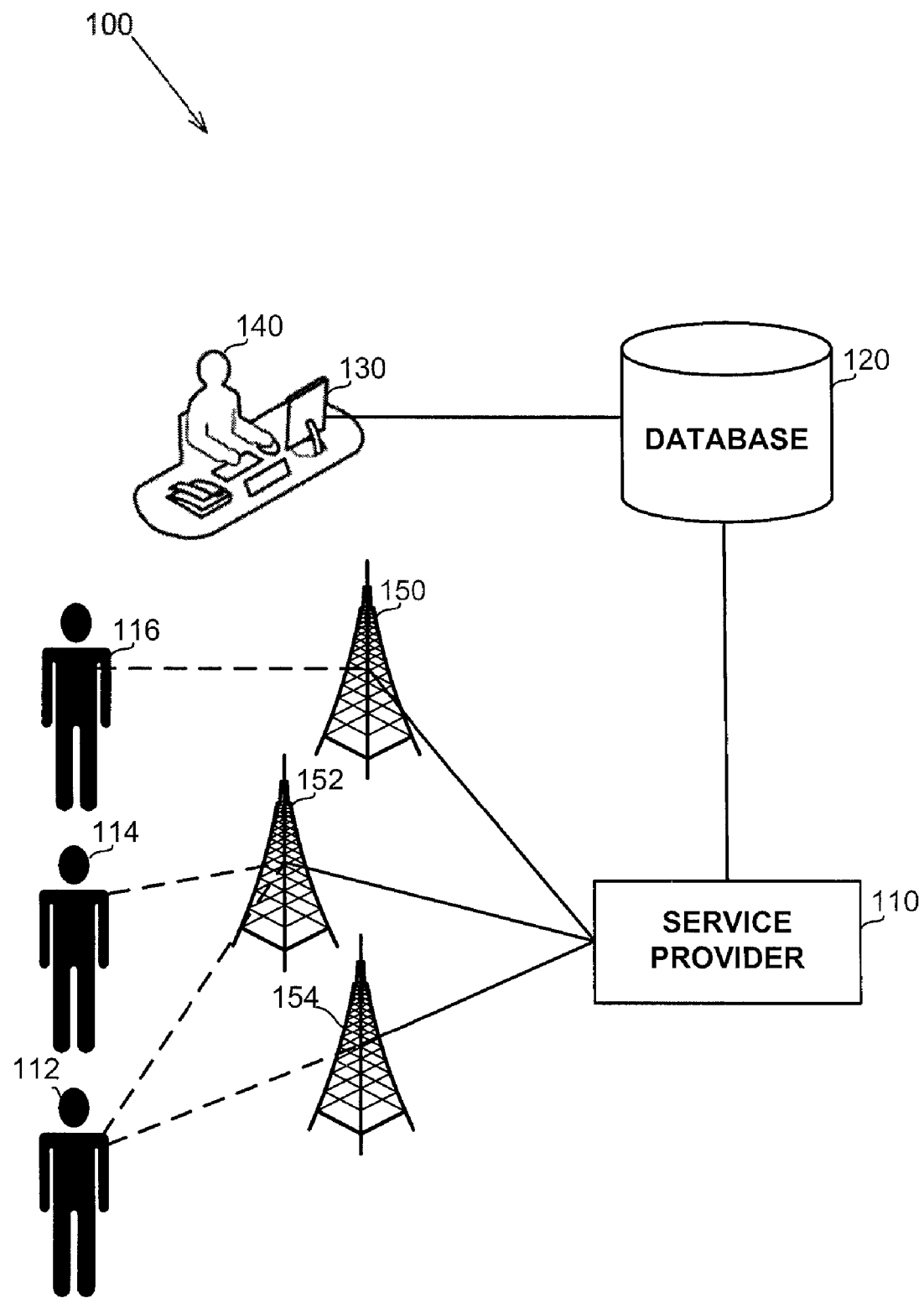
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to identify a transmitter causing handoff failures. Another technical problem dealt with by the disclosed subject matter is to identify a transmitter causing handoff failures based on a database of the telecommunications system, such as a CDR, and without adding monitoring software or hardware.

One technical solution is to determine a transmitter quality of each transmitter based on number of services other transmitters failed to provide. Another technical solution is to determine a relation between transmitters to identify a likelihood of a service being provided by a first transmitter to be handoffed to a second transmitter. Yet another technical solution is to determine the relation based on data in a database of the telecommunication system, such as a CDR database.

One technical effect of utilizing the disclosed subject matter is determining a quality level of a transmitter. Another technical effect of utilizing the disclosed subject matter is indicating to a user of a transmitter that may not be able to comply with handoff requests. Yet another technical effect of utilizing the disclosed subject matter is to provide a graphical representation of a low-quality transmitter.

Referring now to FIG. 1 showing a computerized environment in which the disclosed subject matter is used, in accordance with some exemplary embodiments of the subject matter. A computerized environment 100 comprises a service provider 110, such as a cellular telecommunication service provider. The service provider 110 provides a service to a client, such as clients 112, 114, 116. The clients may be using a device (not shown), such as a cellular device, a mobile phone, a wireless Personal Digital Assistant (PDA), a laptop, WiFi-based apparatus, WiMAX-based device and the like. In some exemplary embodiment, the service is a data or voice call or any other service provided to clients, such as subscribers, of a telecommunication network.

The computerized environment 100 further comprises network transmitters 150, 152, 154, such as for example cellular towers, RF transceivers and the like. The network transmitters 150, 152, 154 are utilized by the service provider 110 to provide one or more services to the clients, such as clients 112, 114, 116. In some exemplary embodiments, one or more of the network transmitters 150, 152, 154 are utilized to provide a service to a client, such as for example client 112.

The service provider 110 maintains a database 120 comprising data records describing services that were provided. In an exemplary embodiment, the database 120 is maintained for billing purposes or business intelligence purposes. In some exemplary embodiments, the data records may be CDRs. In other exemplary embodiments, the data records comprise a transmitter field indicating a network transmitter used for providing the service and a quality field indicating a level of quality provided by the network transmitter. In yet other exemplary embodiments, the data records may further comprise a timestamp field indicating the time in which the service was provided. In an exemplary embodiment, the level of quality is either one, indicating a service successfully provided or zero, indicating a service not fully provided. In another exemplary embodiment, the level of quality is selected from a range of qualities, such as one to five, one to ten and the like.

The computerized environment further comprises a handoff failure identifier 130 5 which may be used by a user 140 to determine a quality level of an at least one network transmitter. The handoff failure identifier 130 determines a quality level of a network transmitter, such as the network transmitter 150, based on the content of the database 120. In some exemplary embodiments, the quality level is determined based on feedback from a client, such as client 112, the content of the database 120 and the like.

Figure 2:
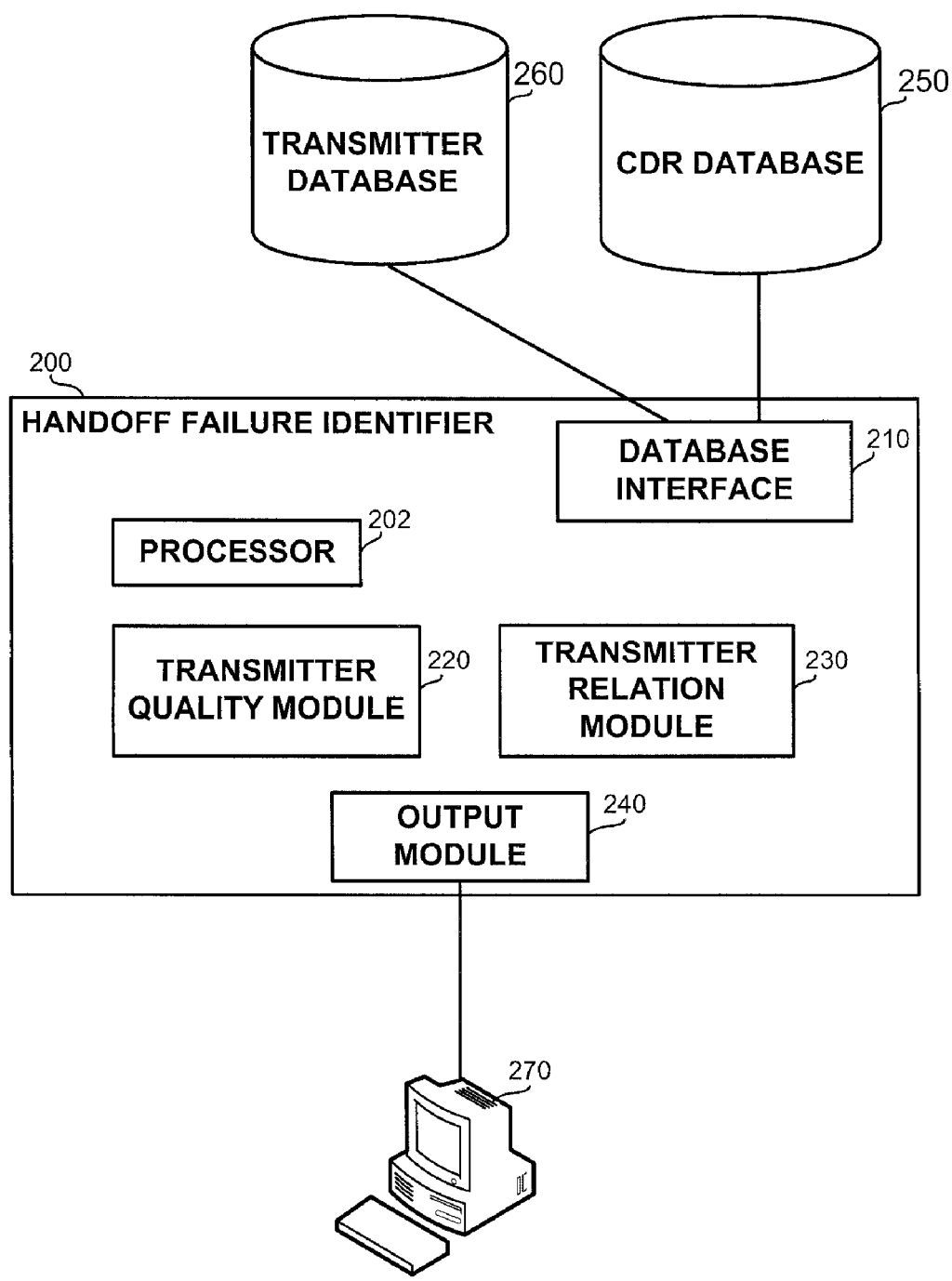
FIG. 2 shows a block diagram of a computerized handoff failure identifier in accordance with some exemplary embodiments of the disclosed subject matter.

Referring now to FIG. 2 showing a block diagram of a computerized handoff failure identifier in accordance with some exemplary embodiments of the disclosed subject matter. A computerized handoff failure identifier 200 may comprise a database interface 210, a transmitter relation module 230, a transmitter quality module 220 and an output module 240.

The database interface 210 is configured to enable retrieval of information from a database, such as a CDR database 250.

The transmitter relation module 230 is configured to determine a relation between a first network transmitter and a second network transmitter. In an exemplary embodiment of the disclosed subject matter, the transmitter relation module 230 determines a likelihood of a service provided by the first transmitter to be handoffed to the second transmitter. A service is said to be handoffed when the service is provided to a client using a first network transmitter and it is transferred to a second network transmitter without interrupting the service. The transmitter relation module 230 may determine the likelihood based on past call information, such as comprised in the CDR database 250.

In another exemplary embodiment of the disclosed subject matter, geographical information may be utilized to determine the likelihood. For example, in case the first network transmitter is located very far from the second network transmitter, for example a thousand km away, it is not likely that the first network transmitter will initiate a handoff request from the second network transmitter. In case the first transmitter is located near the second network transmitter, for example within reception range of a mobile phone, it is more likely that the handoff request will occur.

In another exemplary embodiment, demographical information may be used to determine the likelihood. For example, in case the first network transmitter is located within a suburb and the second network transmitter is located in proximity to a road leading out of the suburb, it is likely that during the morning time, when many people are commuting, the first network transmitter handoff calls to the second network transmitter. Using demographical information a route people may take may be approximated and used to determine the likelihood.

In another exemplary embodiments, the likelihood is a probability. In yet another exemplary embodiment, the probability is calculated based on the CDRs. The CDRs may indicate a first network transmitter initially providing a service to a call and a second network transmitter providing the service when the service has ended. Alternatively, the system may track where subscribers are receiving consecutive services. For example, in an exemplary cellular service provider, if many customers make a call in cellular cell A and make their next call in cellular cell B, the system can deduce that the likelihood for handoff from a first transmitter providing the service for cellular cell A to a second transmitter providing the service for cellular cell B is high. Using the CDRs it is possible to determine a probability matrix of N×N, where N is the number of network transmitters. A cell (i,j) in the probability matrix indicates a portion of the calls using initially a network transmitter i that ended while using a network transmitter j. By normalizing absolute numbers, the probabilities may be determined. In some exemplary embodiments, a cell (i,i) may be zero or may be a value indicating a portion of service fails that are caused due to a problem with network transmitter i, and not due to a handoff failure.

The transmitter quality module 220 may determine a quality of a network transmitter. In some exemplary embodiments of the disclosed subject matter, the quality is determined based on the CDR database 250. For example, the transmitter quality module 220 may indicate a number of services not fully provided by the network transmitter. In some exemplary embodiments, the transmitter quality module 220 may determine a vector of length N. The vector indicates a number of services not fully provided by each network transmitter (such as for example a cell tower).

In yet other exemplary embodiments of the disclosed subject matter, the transmitter quality module 220 may utilize the probability matrix determined by the transmitter relation module 230 to determine the quality of the network transmitter. The vector may be multiplied by the probability matrix to determine an outcome vector. This multiplication may be executed multiple times. In an exemplary embodiment, some network transmitters provide a service in a relative small area. In such an embodiment, it 5 may be likely that a service will be handoffed between more than one pair of network transmitters during a single service. In such an exemplary embodiment, the probability matrix may be raised to the power of a decay factor at each iteration. The decay factor is a positive number smaller than one. By raising the probability matrix to the power of the decay factor, the probabilities that the service is handoffed is reduced. The decay factor expresses the reduced probability that a service that was handoffed N times will be handoffed an additional time. The outcome vector indicates a number of assumed services that were not provided due to a handoff failure of each network transmitter. By multiplying the vector with the probability matrix, each failed call is said to be passed or forwarded to a next network transmitter, as it normally (with a known probability) would have. For example, in an exemplary scenario, 20% of the calls serviced by a first network transmitter are directed to a second network transmitter, and 80% are directed to a third network transmitter. In case the first network transmitter was unable to provide service for twenty service requests, the second network transmitter is said to have caused four failures, and the third network transmitter is said to have caused sixteen failures. In some exemplary embodiments, the probability matrix may also comprise a portion of the calls that were not handoffed. For example, referring again to the aforementioned exemplary scenario, in case 50% of the calls are handoffed, and 50% are not, ten of the failed calls are attributed to the first network transmitter, two are attributed to the second network transmitter and eight are attributed to the third network transmitter.

By multiplying the probability matrix with the vector an outcome vector is determined which indicates for each network transmitter a number of failed services that occurred in one or more near-by network transmitters that are attributed to a handoff failure of the network transmitter. A problematic network transmitter that does not enable near-by network transmitters to handoff services to the problematic network transmitter may be indicated by a relatively large number, such as any number above a predetermined threshold, associated to it by the outcome vector. It will be noted that near-by network transmitters are not necessarily close to each other geographically, but rather it is likely that a service provided by a first network transmitter be transferred to a second network transmitter.

The output module 240 may be utilized to indicate a problematic network transmitter to a user (not shown). In some exemplary embodiments, the indication is a list of one or more problematic network transmitters. The list may be stored in a computerized device 270 and/or displayed by the computerized device 270. In another exemplary embodiment, the indication is a graphical display, such as a map, in which a problematic network transmitter is displayed differently than other network transmitters. For example, the problematic network transmitter may be highlighted, colored, a representing icon may appear blinking and the like.

In some exemplary embodiments of the disclosed subject matter, the computerized handoff failure identifier 200 further comprises a processor 202. The processor 202 is a Central Processing Unit (CPU), a microprocessor, an electronic circuit, an Integrated Circuit (IC) or the like. The processor 202 may be utilized to perform computations required by the computerized handoff failure identifier 200 or any of it subcomponents, such as for example the database interface 210, the transmitter relation module 230, the transmitter quality module 22, the output module 240 or any other subcomponent.

Figure 3:
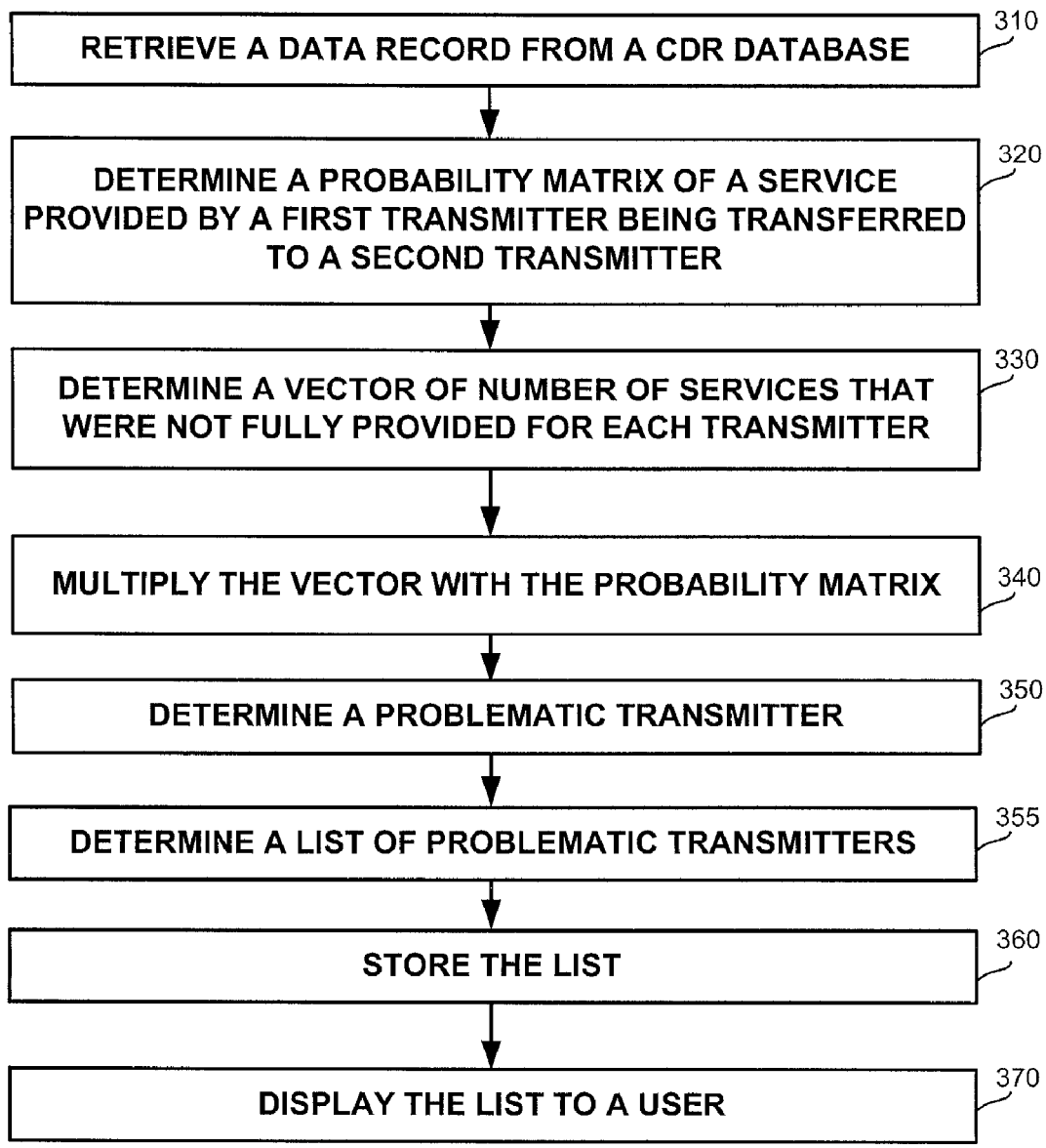
FIG. 3 shows a flowchart diagram of a method in accordance with some exemplary embodiments of the disclosed subject matter.

Referring now to FIG. 3 showing a flowchart diagram of a method in accordance with some exemplary embodiments of the disclosed subject matter.

In step 310, an at least one data record in a CDR database, such as 250 of FIG. 2, is retrieved. The retrieval may be performed by a database interface, such as 210 of FIG. 2. In some exemplary embodiments, the at least one data record may comprise a portion of the CDR database representing a predetermined time-frame. The time-frame may be continuous or non-continuous. For example, the at least one data record may comprise CDR database records relating to a specific day, week, year and the like. Alternatively, the at least one data record may comprise CDR database records relating to a predetermined two hours of a day within a specific date range. For example, all CDR database records relating to services provided between two pm and four pm in predetermined four days. By selecting a portion of the CDR database different problems may be discovered, such as overloads occurring during morning rush-hour, weekdays, holidays and the like.

In step 320, a probability matrix is determined. The probability matrix indicates a probability of a service being provided by a first network transmitter to be transferred to a second network transmitter. In an exemplary embodiment of the disclosed subject matter, the probability matrix is determined based on the at least one data record. The at least one data record may comprise information regarding a specific service that a first network transmitter initially provided and a second network transmitter eventually provided. Hence, the at least one data record indicates a handoff requested by the first network transmitter from the second network transmitter. In an exemplary embodiment, the number of services initially provided by a first network transmitter and eventually provided by a second network transmitter is counted. A matrix comprising a count for each pair of network transmitters is determined and normalized to determine the probability matrix.

In step 330, a number of services that were not fully provided by each network transmitter is determined. The number may be determined based on the at least one data record. A vector is computed based on the number of services. It will be noted that in some exemplary embodiments, only a portion of the network transmitters is evaluated to decrease computation time, to focus on problematic network transmitters, to ignore predetermined network transmitters and for other similar reasons.

In step 340, the vector is multiplied with the probability matrix and an outcome vector is determined.

In step 350, the outcome vector is inspected and a one or more problematic network transmitters are identified. In an exemplary embodiment, a network transmitter having an associated coefficient in the outcome vector that is greater than a predetermined number is considered problematic. In another exemplary embodiment, a network transmitter having an associated coefficient in the outcome vector that is greater than a median, average or the like of the coefficients of the outcome vector is considered problematic.

In step 355, a list of problematic network transmitter is compiled.

In step 360, the list is stored in a computer readable medium.

In step 370, the list is displayed to a user. The list may be displayed by indicating all problematic network transmitters. For example, the list may be displayed by writing an identification code for each problematic network transmitter. In another exemplary embodiment, the list may be displayed graphically. For example, the list may be displayed on a map representing all network transmitters locations wherein a problematic network transmitter is displayed in a different manner than a non-problematic network transmitter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step 5 plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a processor, wherein the processor is coupled with a non-transitory computer readable medium, the method comprising:
    retrieving an at least one data record from a database; the at least one data record represents a first service provided by a telecommunication system; the at least one data record comprises:
        an indication of a transmitter used for providing the first service; and
        a quality measurement of the first service;
    determining an indication of a first transmitter providing a second service to initiate a request from a second transmitter to provide the second service, wherein the indication is a probability of the first transmitter to initiate the request from the second transmitter;
    determining a probability matrix;
    determining a vector comprising at least one coefficient; the at least one coefficient is a number of service requests not fully provided;
    determining a quality of service provided by an additional transmitter, wherein the quality of service provided by the additional transmitter is a number of service requests not fully provided; the quality of service is determined based on:
        the quality measurement of a portion of the at least one data record; and
        the indication;
    wherein said determining the quality of service is performed by multiplying the probability matrix with the vector; and
    whereby a quality measurement associated with the first transmitter is transformed to a quality measurement associated with the second transmitter.

2. The method of claim 1, wherein the indication of the first transmitter to initiate the request from the second transmitter is determined using the at least one data record.

3. The method of claim 1, wherein the indication of the first transmitter to initiate the request from the second transmitter is determined using information associated with a transmitter.

4. The method of claim 1 further comprising storing the determined quality of service in a map comprising an indication of a low quality transmitter.

5. The method of claim 3, wherein the information associated with the transmitter is selected from the group consisting of geographical information and demographical information.

6. The method of claim 4, wherein the telecommunication system is a cellular communication system; and wherein the at least one data record is a Call Detail Record.

7. The method of claim 1, wherein the telecommunication system is a wireless communication system.

8. The method of claim 7, wherein the wireless communication system is a cellular communication system.

9. The method of claim 8, wherein the at least one data record is a Call Detail Record.

10. A computerized apparatus, the apparatus comprising a processor which is coupled with a non-transitory computer readable medium, the processor is arranged to:
    retrieve an at least one data record from a database; the at least one data record represents a first service provided by a telecommunication system; the at least one data record comprises:
        an indication of a transmitter used for providing the first service; and
        a quality measurement of the first service;
    determine an indication of a first transmitter providing a second service to initiate a request from a second transmitter to provide the second service, wherein the indication is a probability of the first transmitter to initiate the request from the second transmitter;
    determine a probability matrix;
    determine a vector comprising at least one coefficient; the at least one coefficient is a number of service requests not fully provided;
    determine a quality of service provided by an additional transmitter, wherein the quality of service provided by the additional transmitter is a number of service requests not fully provided; the quality of service is determined based on:
        the quality measurement of a portion of the at least one data record; and
        the indication;
    wherein determining the quality of service is performed by multiplying the probability matrix with the vector; and
    whereby a quality measurement associated with the first transmitter is transformed to a quality measurement associated with the second transmitter.

11. The apparatus of claim 10, wherein the indication of the first transmitter to initiate the request from the second transmitter is determined using the at least one data record.

12. The apparatus of claim 10, wherein the indication of the first transmitter to initiate the request from the second transmitter is determined using information associated with a transmitter.

13. The apparatus of claim 10, wherein said processor is arranged to store the determined quality of service in a map comprising an indication of a low quality transmitter.

14. The apparatus of claim 10, wherein the telecommunication system is a wireless communication system.

15. The apparatus of claim 14, wherein the wireless communication system is a cellular communication system.

16. The apparatus of claim 15, wherein the at least one data record is a Call Detail Record.

17. A computer program product, said computer program product comprising a non-transitory computer readable medium, in which computer instructions are stored, which instructions, when read by a computer, cause the computer to:
    retrieve an at least one data record from a database; the at least one data record represents a first service provided by a telecommunication system; the at least one data record comprises:
        an indication of a transmitter used for providing the first service; and
        a quality measurement of the first service;
    determine an indication of a first transmitter providing a second service to initiate a request from a second transmitter to provide the second service, wherein the indication is a probability of the first transmitter to initiate the request from the second transmitter;

determine a probability matrix;

determine a vector comprising at least one coefficient; the at least one coefficient is a number of service requests not fully provided;

determine a quality of service provided by an additional transmitter, wherein the quality of service provided by the additional transmitter is a number of service requests not fully provided; the quality of service is determined based on:

the quality measurement of a portion of the at least one data record; and the indication;

wherein determining the quality of service is performed by multiplying the probability matrix with the vector; and whereby a quality measurement associated with the first transmitter is transformed to a quality measurement associated with the second transmitter.

18. The computer program product of claim 17, wherein the indication of the first transmitter to initiate the request from the second transmitter is determined using the at least one data record.

19. The computer program product of claim 17, wherein the indication of the first transmitter to initiate the request from the second transmitter is determined using information associated with a transmitter.

20. The computer program product of claim 17, wherein the telecommunication system is a cellular communication system; and wherein the at least one data record is a Call Detail Record.

\* \* \* \* \*